UNITED STATES PATENT OFFICE.

ALEXANDER McKECHNIE, OF BIRMINGHAM, ENGLAND.

METHOD OF SEPARATING AND RECOVERING NICKEL.

1,377,713.      Specification of Letters Patent.     Patented May 10, 1921.

No Drawing. Original application filed May 3, 1920, Serial No. 378,537. Divided and this application filed September 17, 1920. Serial No. 410,925.

*To all whom it may concern:*

Be it known that I, ALEXANDER MC-KECHNIE, a subject of the King of Great Britain, residing at Birmingham, England, have invented certain new and useful Improvements in Methods of Separating and Recovering Nickel, the same being a division of my former application filed May 3, 1920, Serial Number 378,537, of which the following is a specification.

My invention relates to a new and useful method of separating or recovering nickel from cupro-nickel alloys, or from scrap or other materials, where the copper and nickel are present in a metallic state, and my invention consists, essentially, in bessemerizing in a suitable furnace or basic converter, a molten charge of cupro-nickel material and continuing the bessemerizing action until the whole or a material part of the nickel has been volatilized out of the material and carried over as nickel oxid, to a condenser or otherwise intercepted or collected for reduction to a metallic nickel.

My invention further consists of the steps and succession of steps constituting the method which I will hereinafter describe and point out in the appended claims.

In my aforesaid prior application I have disclosed a method of separating and recovering nickel from cupro-nickel alloys, or from scrap or other materials where the copper and nickel are present in a metallic state, said method consisting essentially, in rapidly melting on the hearth of a basic reverberating furnace, a charge of alloy containing metallic nickel and copper, and blowing air through the charge which is maintained in a molten state. This simultaneous air and heat treatment assisted by the agitations due to the employment of the air under pressure, results in a separation of the whole or a material part of the nickel content by volatilization into a fume or vapor of nickel oxid. As the nickel is volatilized out from the charge of material under treatment, the resultant oxid is carried over as a fume or vapor and is finally recovered by some appropriate means.

In the present invention which may be regarded as an alternative method of separating or recovering nickel from cupro-nickel alloys or like material, a charge of cupro-nickel material reduced to a molten state by any suitable means and whether obtained from the concentration of matte in a converter or by separate melting, is bessemerized in a basic converter. In my method the operation of bessemerizing is continued until the whole or a portion of the nickel content has been volatilized and the fumes or vapor carried over in the form of oxid to suitable condenser flues or the like arranged in appropriate connection with the converter.

In the method described, I am able to quickly and economically separate nickel from cupro-nickel alloys, or from scrap or other materials containing copper and nickel in a metallic state, and convert the same into nickel oxid for reduction into metallic nickel.

Having thus described my invention what I claim and desire to secure by Letters Patent is:—

1. The method herein described of separating nickel from cupro-nickel alloy, or other material containing metallic copper and nickel in the metallic state, said method consisting, essentially, in reducing the material to a molten state and bessemerizing the same in a basic converter, continuing the bessemerizing until the whole or a substantial part of the nickel is volatilized out, and collecting the vapor or fumes as nickel oxid.

2. The method herein described of separating nickel from cupro-nickel alloy, or other material containing copper and nickel in the metallic state, said method consisting, essentially, in bessemerizing a molten charge of cupro-nickel material in a basic converter and continuing the bessemerizing until the whole or a part of the nickel is volatilized out and carried over as nickel oxid to suitable condensing means arranged in connection with the said converter.

In testimony whereof I affix my signature in presence of two witnesses.

ALEX. McKECHNIE.

Witnesses:
ARTHUR SADLER,
WINIFRED M. SADLER.